United States Patent [19]
Ginn

[11] Patent Number: 5,123,691
[45] Date of Patent: Jun. 23, 1992

[54] ELECTRIC LOCK APPARATUS FOR VEHICULAR TOOL BOX

[76] Inventor: James Ginn, 2601 Cold Stream, Fort Worth, Tex. 76123

[21] Appl. No.: 712,666

[22] Filed: Jun. 10, 1991

[51] Int. Cl.⁵ ............................................. B60R 9/00
[52] U.S. Cl. ................................. 296/37.1; 296/37.6; 296/24.1; 292/201
[58] Field of Search ............... 296/37.6, 37.7, 24.1, 296/37.1, 97.22; 292/201, 144, 34.6; 220/324, 315

[56] References Cited

U.S. PATENT DOCUMENTS

| | | | |
|---|---|---|---|
| 4,488,669 | 12/1984 | Waters | 296/37.6 |
| 4,728,017 | 3/1988 | Mullican | 296/24.1 |
| 4,770,330 | 9/1988 | Bonstead et al. | 296/37.6 |
| 4,892,345 | 1/1990 | Rachael, III | 296/24.1 |

*Primary Examiner*—Robert R. Song
*Attorney, Agent, or Firm*—Geoffrey A. Mantooth

[57] ABSTRACT

In a vehicle having a tool box, an electric lock apparatus for the tool box is provided. The tool box has a latch for preventing the opening of a lid on the tool box. The latch is movable between a latched position and an unlatched position. A motor is provided in the tool box. The motor alternatively releases and engages the latch. A switch is provided in the passenger compartment of the vehicle. The switch is connected to a vehicle power source and to the motor. The switch operates the motor and allows the tool box to be either locked or unlocked from the passenger compartment.

11 Claims, 2 Drawing Sheets

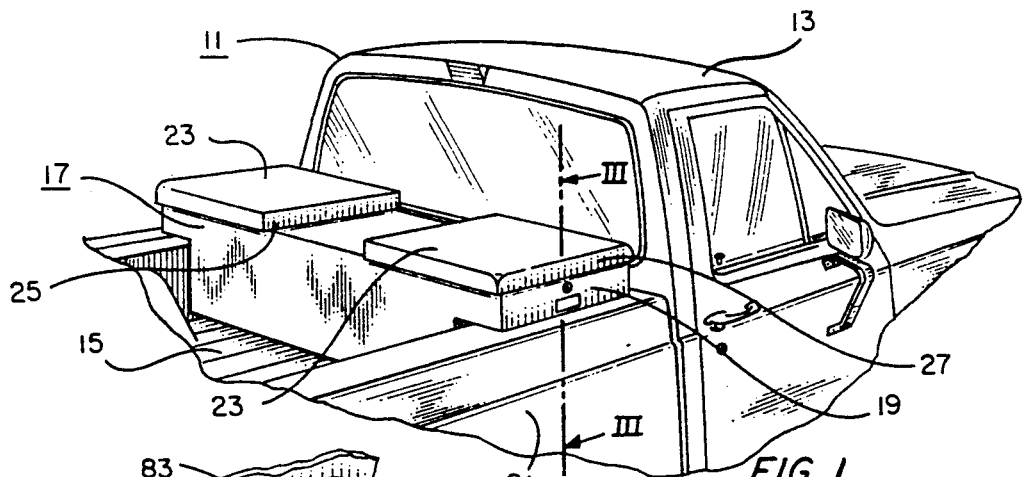
FIG. 1
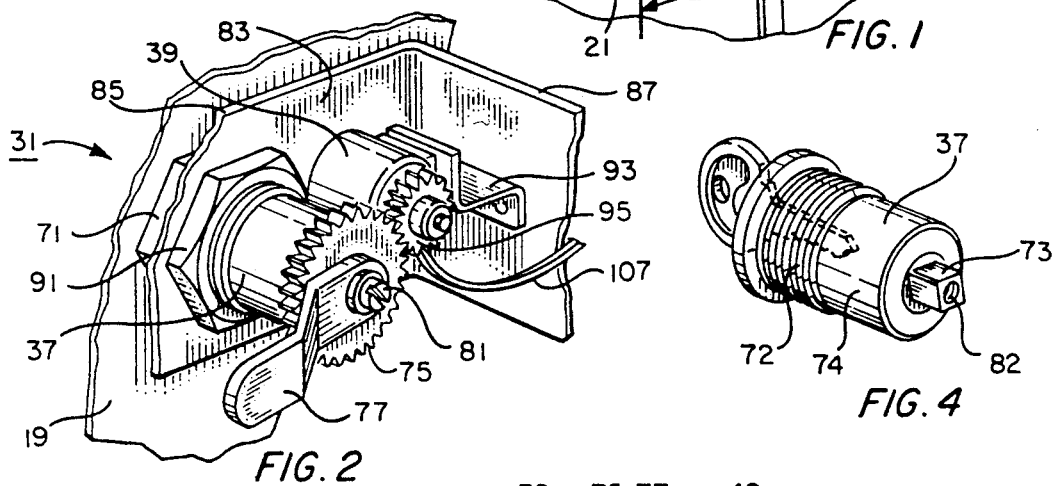
FIG. 2
FIG. 4
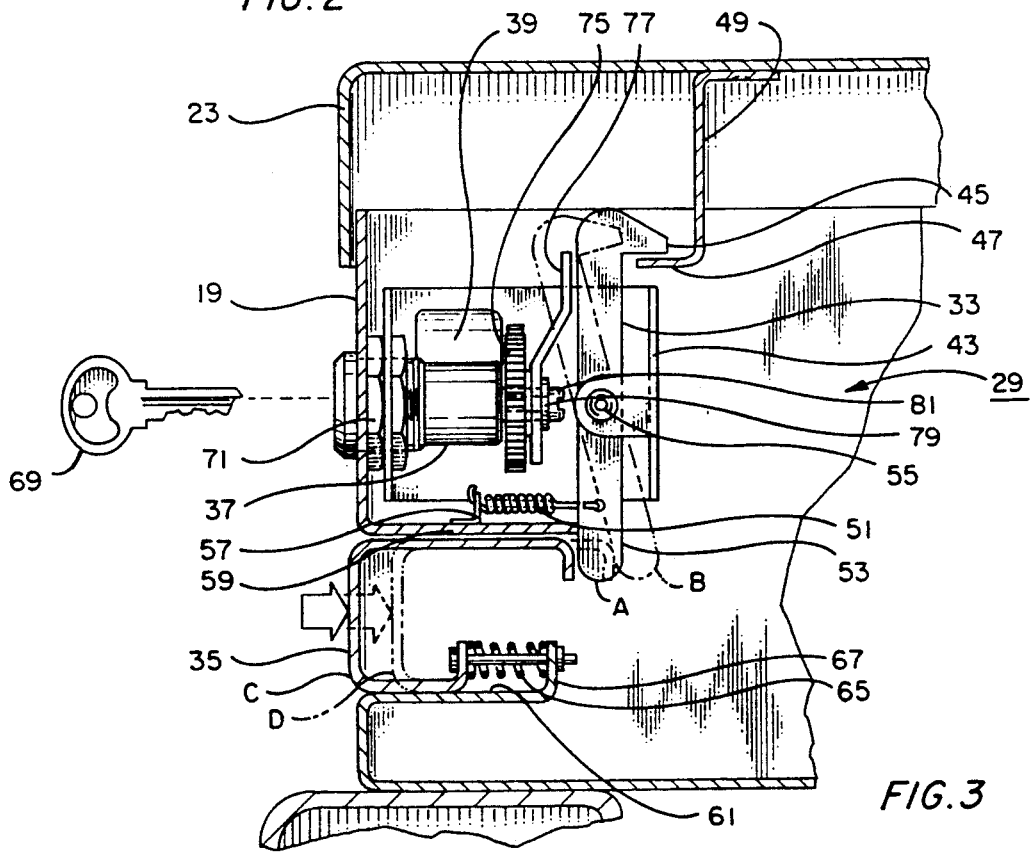
FIG. 3

ELECTRIC LOCK APPARATUS FOR VEHICULAR TOOL BOX

FIELD OF THE INVENTION

The present invention relates to locks on vehicular tool boxes such as might be found on pick-up trucks.

BACKGROUND OF THE INVENTION

Pick-up trucks are widely used as work vehicles. Pick-up trucks have a cab for the driver and passengers and a bed that extends rearwardly from the cab. Many trucks are equipped with tool boxes in the bed of the truck. These tool boxes provide storage for tools and other objects. A common arrangement is where a tool box extends across the width of the bed and is located next to the cab. A tool box typically has one or more lids or doors that are accessible from the sides of the truck. For reasons such as theft deterrence, the lids are provided with locks. The locks are opened manually with keys. To open the locks, the driver must exit the cab and unlock whichever tool box lid he desires to open. This becomes inconvenient for the driver, who has to keep track of and have ready the tool box keys.

SUMMARY OF THE INVENTION

It is an object of the present invention to provide an apparatus that allows the unlocking of a vehicular tool box for the passenger compartment.

It is another object of the present invention to provide an electric lock for a vehicular tool box.

The electric lock apparatus of the present invention is used in a vehicle having a passenger compartment and a tool box. The tool box is mounted to the vehicle and has a lid for allowing access to an interior compartment thereof. Latch means for latching the tool box lid closed is provided. The latch means is movable between a latched position, wherein the latch means engages the lid so as to prevent the lid from opening, and an unlatched position, wherein the latch means is unengaged from the lid so as to allow the lid to be opened. Blocking means blocks the movement of the latch means from the latched position to the unlatched position. The blocking means is located adjacent to the latch means. Electric motor means moves the blocking means between a blocking position, wherein the latch means is prevented from moving from the unlatched position, and a non-blocking position, wherein the latch means is allowed to move to the unlatched position. The motor means is coupled with the blocking means. Switch means actuates the motor means. The switch means is located in the passenger compartment. The switch means is electrically connected with the motor means and to a power source on the vehicle, wherein the switch means selectively connects the power source to the motor means.

In one aspect, the blocking means is coupled to a lock cylinder mounted to the tool box. The lock cylinder is adapted to receive a key for moving the blocking means between the blocking and non-blocking positions. In another aspect, the motor means moves the blocking means by way of gears. There is a first gear coupled to the motor means and a second gear coupled to the blocking means and to the locking cylinder. The first and second gears are meshed together.

In still another aspect, the motor means is mounted to the tool box by way of a mounting bracket. The mounting bracket is coupled to the lock cylinder so as to allow the mounting bracket to swivel about the lock cylinder wherein the motor means can be positioned inside of the tool box. In still another aspect, the lock cylinder has a pin protruding therefrom. The pin is rotatable relative to an outer casing of the lock cylinder. The blocking means and the second gear are coupled to the pin so as to rotate therewith, wherein a key can be used to move the blocking means.

In another aspect, the electric lock apparatus is installed in a vehicle having a passenger compartment and a tool box. Latch means latches the tool box lid closed. The latch means moves between latched and unlatched positions. An electric motor means moves the latch means between the latched and unlatched positions. The motor means is coupled with the latch means. Switch means actuates the motor means. The switch means is located in the passenger compartment and is electrically connected with the motor means and to a vehicle power source, wherein the switch means selectively connects the power source to the motor means.

In still another aspect, the electric lock apparatus is installed in a vehicle that includes a passenger compartment that has doors which allow access to the compartment. The doors have door lock actuators for locking and unlocking the doors. The passenger compartment has electric door lock switch means for locking and unlocking the doors. The switch means is located in the passenger compartment and is connected to a vehicle power source. The vehicle also has a tool box. Latch means prevents the opening of the lid on the tool box. The latch means is releasable so as to disengage from the lid. Electric motor means for releasing the latch means is provided. The motor means is coupled to the latch means. The motor means is electrically connected to the switch means, wherein the switch means operates the motor means.

BRIEF DESCRIPTION OF THE DRAWINGS

FIG. 1 is a perspective view of a portion of a pick-up truck, with a tool box, incorporating the lock apparatus of the present invention.

FIG. 2 is a perspective view of the lock apparatus of the present invention, in accordance with a preferred embodiment.

FIG. 3 is a side cross-sectional view of the tool box, taken along lines III—III of FIG. 1.

FIG. 4 is a perspective view of the lock cylinder.

DESCRIPTION OF PREFERRED EMBODIMENTS

Figure 5:
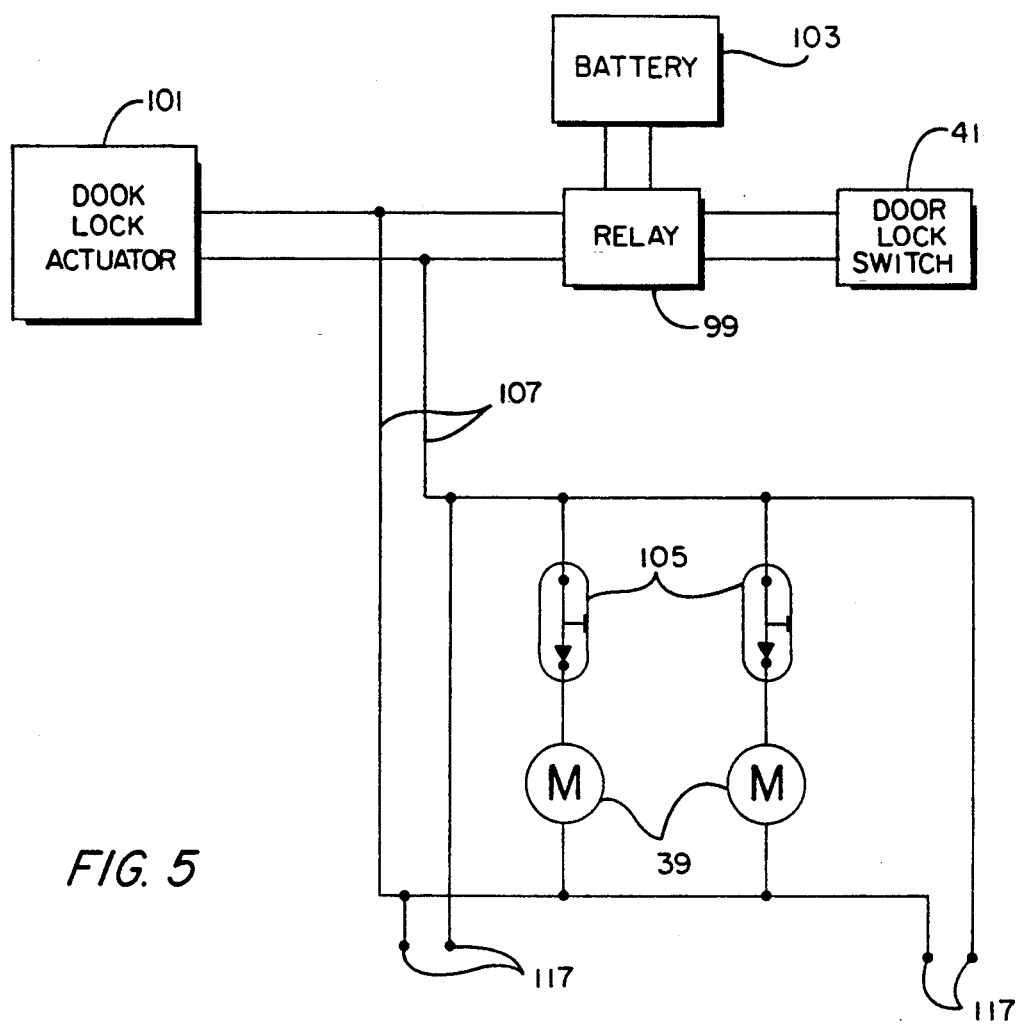
FIG. 5 is an electrical schematic diagram of the circuit for actuating the lock apparatus.

In FIG. 1., there is shown a perspective view of a portion of a pick-up truck vehicle 11. The truck 11 has a cab or passenger compartment 13 and a bed 15 located rearwardly of the cab. In the bed 15 is a conventional tool box 17. The tool box extends across the width of the bed 15 to the sides of the truck. The ends 19 of the tool box 17 overlap the top ends of the truck side walls 21.

The tool box 17 has two lids 23, one on the driver's side of the box and the other on the passenger's side. The lids are hinged along their centermost edge 25. To open the lids, the outer ends 27 of the lids are lifted up. Once opened, the interior compartment 29 of the tool box can be entered. The lids 23 are locked in the closed position by lock means located inside of the tool box. There is a lock means for each lid. The electric lock apparatus 31 of the present invention permits an operator to unlock the lids 23 to the tool box remotely from the truck cab 13. The electric lock apparatus 31 includes latch means 33, 77 a push button release 35, a lock cylinder 37, a motor 39 and switch means 41. The latch means includes a latch 33 and a blocking tab 77.

There is a latch 33, a push button release 35, a lock cylinder 37 and a motor 39 for each lid on the tool box 17.

The lids 23 are normally kept in the closed position by the latch 33. Each latch 33 is an elongated bar that is pivotally coupled to a mounting bracket 43. The mounting bracket is coupled to a respective end wall 19 of the tool box. The upper end of the latch 33 has a projection 45 extending therefrom. When the latch 33 is in an engaged position A, as shown in FIG. 3, the projection 45 cooperatively engages the upper surface of a lip 47 on the lid 23. The lip 47 is formed by a bracket 49 that is coupled to the lid. When the latch 33 pivots to an unlatched position B (shown in dashed lines in FIG. 3), the projection 45 is disengaged from the lid lip. With the latch 33 in the unlatched position B, the lid can be lifted open. When pivoting from the latched position to the unlatched position, the latch moves in a counterclockwise direction, with regard to the orientation of FIG. 3.

The latch 33 is maintained in the engaged position by a spring 51. One end of the spring 51 is coupled to the lower end 53 of the latch 33, at a location below the pivot axis 55. The other end of the spring 51 is coupled to an anchor point 57. The anchor point 57 is secured to a wall 59 of the tool box 17. The spring 51 pulls the latch 33 in a clockwise direction (with respect to the orientation of FIG. 3), thereby maintaining the latch in the latched position A.

The push button release 35 is provided to move the latch 33 from the engaged position A to the unlatched position B. The push button 35 is contained in a cavity 61 in the wall 19 of the tool box. A portion of the push button 35 protrudes out from the tool box, so as to be accessible to a human operator. The push button has an actuation portion 63 on its inner end. The actuation portion 63 contacts the lower end 53 of the latch 33. The push button is movable between in and out positions. When the push button 35 is in the out position C, the latch 33 is maintained in the engaged position A by the spring 51. As the push button 35 is pushed to the in position D into the tool box, it pushes the lower end 53 of the latch 33 and causes the latch to move to the unlatched position B, wherein the lid 23 is released. The push button 35 is biased in the out position C by a spring 65. One end of the spring 65 is coupled to the push button 35 while the other end of the spring is coupled to a wall 67 of the tool box. The spring 65 pushes the push button outwardly. As the push button is pushed inwardly, the force of the spring 65 is overcome. When the push button 35 is released, the spring 65 pushes the push button back to the out position C.

The lock cylinder 37 is conventional, having a key slot therein for receiving a key 69. The lock cylinder 37 is mounted to the end wall 19 of the tool box such that the cylinder projects inwardly into the tool box. A nut 71 secures the lock cylinder to the tool box wall 19. The nut 71 is received by threads 72 on the lock cylinder. The lock cylinder 37 has a pin 73 projecting from its inner end. The pin 73 is square in transverse cross-section (see FIG. 4) and is rotatable with respect to the outer casing 74 of the lock cylinder 37. The pin 73 receives a gear 75, a blocking tab 77, a washer 79 and a screw 81 respectively. The gear 75 and the blocking tab 77 have square openings that matingly receive the pin 73 so as to be rotatively coupled to the pin. The screw 81 is received by a threaded bore 82 at the end of the pin 73. The screw retains the gear and the blocking tab onto the pin.

The lock cylinder 37 is installed in the tool box such that the screw 81 is about even with and adjacent to the pivot axis 55 of the latch 33, as shown in FIG. 3. Thus, with the blocking tab 77 in the up position, as shown in FIG. 3, the latch 33 is prevented from moving to the unlatched position B from the latched position A. The blocking tab 77 may be rotated out of the up position to either a side position (shown in FIG. 2) or a down position, so as to allow the latch 33 to move to the unlatched position.

The motor 39 is a conventional electric motor. The motor 39 is mounted to the wall 19 of the tool box by way of a motor bracket 83 so as to be adjacent to the lock cylinder 37. The motor bracket 83 has first and second flat plates 85, 87. The first plate 85 is coupled to the outside diameter of the lock cylinder 37 by way of two nuts 71, 91, one on each side of the first plate 85. The lock cylinder is threaded to received the nuts. The second plate 87 extends perpendicularly from the free end of the first plate 85. The motor 39 is coupled to the second plate 87 by a bracket 93. The motor 39 has a gear 95 that meshes with the gear 75 of the lock cylinder.

Referring to FIG. 5, the electrical schematic diagram of the electric lock apparatus is shown. The motors 39 are electrically coupled into the electric door lock system of the truck. The conventional door lock system includes a door lock switch 41, a relay 99 and door lock actuators 101. The door lock switch 41 is located in the passenger compartment 13 of the truck. The door lock switch 41 is connected to the door lock actuator 101 by way of the relay 99. The relay 99 is connected to the vehicle battery 103. The relay 99 provides current isolation by allowing a small current provided by the door lock switch 41 to control the larger current required to operate the door lock actuators 101. The door lock switch 41 and the relay 99 are bipolar to enable the door lock actuator to operate bidirectionally between lock and unlock.

The motors 39 are electrically coupled to the output of the relay 99 by a pair of wires 107, so as to be in parallel with the door lock actuators 101. Each tool box lock is provided with a motor. The motors 39 are connected in parallel to each other. A current protection device 105 is connected in series with each motor.

The operation of the electric lock apparatus 31 will now be described. With the latch 33 located in the latched position A as shown in FIG. 3, the lid 23 of the tool box 17 is latched in the closed position. The tool box lid is locked when the blocking tab 77 is in the up position as shown in FIG. 3. With the lid locked, attempts to open the lid 23 by pushing the push button 35 are unsuccessful, because the latch 33 is unable to move to the unlatched position B. The blocking tab 77 prevents movement of the latch into the unlatched position.

To unlock the tool box lids, the operator activates the door lock switch 97 to the unlocked position, thereby energizing the motors 39. Each motor rotates its gear 95, which in turn rotates the gear 75 on the lock cylinder. The gear rotates the pin 73 and the blocking tab 77 out of the upper blocking position (see FIG. 2). With the blocking tab no longer blocking the latch, the operator can open the tool box lid by pushing the push button 35 inwardly. The push button 35 moves the latch 33 to the second or unlatched position B, thereby allowing the lid 23 to be opened.

The tool box lids can also be individually unlocked using a key 69. The operator inserts the key 69 into the respective lock cylinder 37 and rotates the key. This rotates the pin 73 which in turn rotates the blocking tab 77 out of the blocking position. The operator then pushes the push button 35 to release the latch.

To lock the tool box lid, the operator closes the lid 23 and then actuates the door lock switch 97 to the locked position. The motors 39 are energized with reverse polarity. The motors thus rotate in the opposite direction relative to their direction for unlocking. Each motor turns the respective blocking tab 77 to the blocking position, wherein the lid is locked. Alternatively, the lock can be locked using the key 69. The key 69 is inserted into the lock cylinder 37 and rotated in the opposite direction to move the blocking tab into the blocking position.

Figure 6:
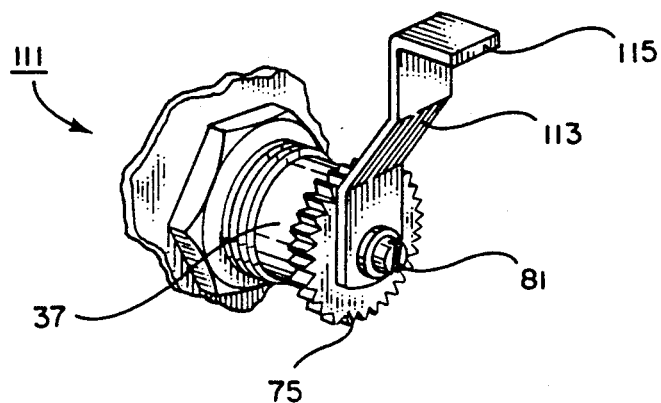
FIG. 6 is a perspective view of a portion of the lock apparatus of the present invention, in accordance with another embodiment.

In FIG. 6, there is shown a portion of the lock apparatus 111, in accordance with another embodiment. In this embodiment, the latch means 113 is directly coupled to the lock cylinder 37. The latch 113 is a modified blocking tab, wherein the free end of the latch has a projection 115 for engaging the lip on the lid. The latch has a square opening for receiving the square pin on the lock cylinder. The lock cylinder with the latch 113 is substituted for the lock cylinder with the blocking tab 77 of FIGS. 2 and 3. The latch 113 is rotated between the latched position and the unlatched position by either the motor, which rotates the gear 75 and thus the pin, or by the key that is inserted into the lock cylinder. In the latched position, the latch 113 engages the lid, preventing the door from opening. In the unlatched position, the latch is rotated 90 degrees out of the latched position so as to no longer engage the lid. No push button is required to release the latch. Instead, the latch is directly controlled by either the motor 39 or the key 69.

The electric lock apparatus of the present invention can be retrofitted into vehicles having existing key-type locks on their tool boxes. To install the electric lock apparatus, the existing lock cylinder in the tool box is removed. Then, the lock cylinder 37 of the lock apparatus is inserted into the tool box. The motor bracket 83 is installed onto the lock cylinder using the two nuts 71, 91. The motor bracket 83 can be swiveled 360 degrees around the lock cylinder to find a suitable location for the motor 39 and the motor bracket within the tool box. Next, the gear 75 and the blocking tab 77 are installed onto the lock cylinder pin 73. The screw 81 retains the gear and blocking tab on the lock cylinder. Then, the motor 39 is electrically connected into the lid lock electrical system to complete the installation.

The electric lock apparatus can be extended to operate locks on other tool boxes in the same vehicle. Frequently, vehicles are equipped with more than one or two tool box lids, all of which are preferably locked. Each lid lock is provided with a motor, a latch and a lock cylinder. Each motor is connected in parallel to the other motors. Connector plugs 117 (see FIG. 5) are provided to electrically connect these additional motors into the circuit. A connector plug 117 is provided at each motor so that subsequent motors can be ganged together.

The electric lock apparatus of the present invention can be installed into vehicles that are not equipped with electric lid locks. In such a vehicle, a lock switch 41 and relay 99 are installed as described above to the vehicle battery 103. The lock switch 41 is located in the cab so as to be accessible to an operator. Wiring is run through the vehicle from the cab to the tool boxes.

The foregoing disclosure and the showings made in the drawings are merely illustrative of the principles of this invention and are not to be interpreted in a limiting sense.

I claim:

1. A vehicle, comprising:
   a) a passenger compartment;
   b) a tool box for containing and storing objects, said tool box being mounted to said vehicle, said tool box having a lid for allowing access to an interior compartment of said tool box;
   c) latch means for latching said tool box lid closed, said latch means being movable between a latched position, wherein said latch means engages said lid so as to prevent said lid from opening, and an unlatched position, wherein said latch means is unengaged from said lid so as to allow said lid to be opened;
   d) blocking means for blocking the movement of said latch means from said latched position to said unlatched position, said blocking means being located adjacent to said latch means;
   e) electric motor means for moving said blocking means between a blocking position, wherein said latch means is prevented from moving to said unlatched position, and a non-blocking position, wherein said latch means is allowed to move to said unlatched position, said motor means being coupled with said blocking means;
   f) switch means for actuating said motor means, said switch means being located in said passenger compartment, said switch means being electrically connected with said motor means and to a power source on said vehicle, wherein said switch means selectively connects said power source to said motor means.

2. The vehicle of claim 1, wherein said blocking means is coupled to a lock cylinder mounted to said tool box, said lock cylinder being adapted to receive a key for moving said blocking means between said blocking and non-blocking positions.

3. The vehicle of claim 2 wherein said motor means moves said blocking means by way of gears, there being a first gear coupled to said motor means and a second gear coupled to said blocking means and to said locking cylinder, said first and second gears being meshed together.

4. The vehicle of claim 2 wherein said motor means is mounted to said tool box by way of a mounting bracket, said mounting bracket being coupled to said lock cylinder so as to allow said mounting bracket to swivel about said lock cylinder so that said motor means can be positioned inside of said tool box.

5. The vehicle of claim 4 wherein said lock cylinder has a pin protruding therefrom, said pin being rotatable relative to an outer casing of said lock cylinder, said blocking means and said second gear being coupled to said pin so as to rotate therewith, wherein a key can be used to move said blocking means.

6. A vehicle, comprising:
a) a passenger compartment;
b) a tool box for containing and storing objects, said tool box being mounted to said vehicle, said tool box having a lid for allowing access to an interior compartment of said tool box;
c) latch means for latching said tool box lid closed, said latch means being rotatable between a latched position, wherein said latch means engages said lid so as to prevent said lid from opening, and an unlatched position, wherein said latch means is unengaged from said lid so as to allow said lid to be opened;
d) electric motor means for rotating said latch means between said latched position and said unlatched position, said motor means being coupled to said latch means;
e) switch means for actuating said motor means, said switch means being located in said passenger compartment, said switch means being electrically connected with said motor means and to a power source on said vehicle, wherein said switch means selectively connects said power source to said motor means.

7. The vehicle of claim 6, wherein said latch means is coupled to a lock cylinder mounted to said tool box, said lock cylinder being adapted to receive a key, wherein aid latch means can be rotated between said latched position and said unlatched position by either said motor means or by said lock cylinder.

8. A vehicle, comprising:
a) a passenger compartment;
b) a tool box for containing and storing objects, said tool box being mounted to said vehicle, said tool box having a lid for allowing access to an interior compartment of said tool box;
c) latch means for latching said tool box lid closed, said latch means being movable between a latched position, wherein said latch means engages said lid so as to prevent said lid from opening, and an unlatched position, wherein said latch means is unengaged from said lid so as to allow said lid to be opened, said latch means being coupled to a lock cylinder mounted to said tool box, said lock cylinder being adapted to receive a key for moving said latch means between said latched position and said unlatched position;
d) electric motor means for moving said latch means between said latched position and said unlatched position, said motor means being coupled to said latch means;
e) switch means for actuating said motor means, said switch means being located in said passenger compartment, said switch means being electrically connected with said motor means and to a power source on said vehicle, wherein said switch means selectively connects said power source to said motor means;
f) said motor means moves said latch means by way of gears, there being a first gear coupled to said motor means and a second gear coupled to said latch means and to said locking cylinder, said first and second gears being meshed together.

9. A vehicle, comprising:
a) a passenger compartment;
b) a tool box for containing and storing objects, said tool box being mounted to said vehicle, said tool box having a lid for allowing access to an interior compartment of said tool box;
c) latch means for latching said tool box lid closed, said latch means being movable between a latched position, wherein said latch means engages said lid so as to prevent said lid from opening, and an unlatched position, wherein aid latch means is unengaged from said lid so as to allow said lid to be opened, said latch means being coupled to a lock cylinder mounted to said tool box, said lock cylinder being adapted to receive a key for moving said latch means between said latched position and said unlatched position;
d) electric motor means for moving said latch means between said latched position and said unlatched position, said motor means being coupled to said latch means;
e) switch means for actuating said motor means, said switch means being located in said passenger compartment, said switch means being electrically connected with said motor means and to a power source on said vehicle, wherein said switch means selectively connects said power source to said motor means;
f) said motor means is mounted to said tool box by way of a mounting bracket, said mounting bracket being coupled to said lock cylinder so as to allow said mounting bracket to swivel about said lock cylinder so that said motor means can be positioned inside of said tool box.

10. The vehicle of claim 9 wherein said lock cylinder has a pin protruding therefrom, said pin being rotatable relative to an outer casing of said lock cylinder, said latch means and said second gear being coupled to said pin so as to rotate therewith, wherein a key can be used to move said latch means.

11. A vehicle, comprising:
a) a passenger compartment having doors that allow access into said compartment, said doors having door lock actuators for locking and unlocking said doors;
b) said passenger compartment having electric door lock switch means for operating said door lock actuators, said switch means being located in said passenger compartment and being connected to a vehicle power source;
c) a tool box for containing and storing objects, said tool box being mounted to said vehicle, said tool box having a lid for allowing access to an interior compartment of said tool box;
d) latch means for preventing the opening of said lid, said latch means being releasable from an engaged position so as to disengage from said lid, wherein said lid can be opened, said lid being prevented from being opened when said latch means is in said engaged position;
e) electric motor means for alternatively releasing and engaging said latch means, said motor means being coupled to said latch means, said motor means being electrically connected to said switch means, wherein said switch means operates said motor means.

* * * * *